US006871947B2

(12) United States Patent
Kanemura

(10) Patent No.: US 6,871,947 B2
(45) Date of Patent: Mar. 29, 2005

(54) CONVEYING DEVICE AND IMAGE RECORDING APPARATUS HAVING THE SAME

(75) Inventor: Shoji Kanemura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/237,777

(22) Filed: Sep. 10, 2002

(65) Prior Publication Data

US 2003/0052954 A1 Mar. 20, 2003

(30) Foreign Application Priority Data

Sep. 19, 2001 (JP) ....................................... 2001-285305

(51) Int. Cl.[7] ............................ B41J 2/01; B65G 17/46; B65G 47/92

(52) U.S. Cl. ....................... 347/104; 347/101; 198/691; 198/688.1; 198/689.1

(58) Field of Search ............................. 198/691, 688.1, 198/689.1, 502.4, 810.01, 805; 347/19, 104, 101, 16; 498/810.03; B41J 2/01, 29/38; B65G 17/46, 47/92, 15/42, 43/00, 47/00; G01D 15/06; G03G 15/01

(56) References Cited

U.S. PATENT DOCUMENTS 4,264,905 A * 4/1981 Shapiro ...................... 340/679
5,076,568 A * 12/1991 de Jong et al. ............. 271/275
5,531,436 A * 7/1996 Ohyama et al. ............ 271/275
5,960,936 A * 10/1999 Kuehnle et al. ............ 198/807
5,975,680 A * 11/1999 Wen et al. ..................... 347/43
6,047,814 A * 4/2000 Alles et al. ............ 198/810.02
6,097,408 A * 8/2000 Fukushima et al. ........... 347/34
6,106,090 A * 8/2000 Uchida et al. ................. 347/8
6,164,761 A * 12/2000 Numata ....................... 347/55
6,179,419 B1 * 1/2001 Rasmussen et al. ........ 347/104
6,332,612 B1 * 12/2001 Kanemura .................. 271/275
6,416,176 B1 * 7/2002 Yasui et al. ................. 347/104
6,508,540 B1 * 1/2003 Lean et al. .................... 347/55
2001/0015746 A1 * 8/2001 Yosimura et al. ........... 347/102

FOREIGN PATENT DOCUMENTS

DE 3333832 A1 * 4/1985 ........... B65G/43/08

* cited by examiner

*Primary Examiner*—Stephen D. Meier
*Assistant Examiner*—Leonard Liang
(74) *Attorney, Agent, or Firm*—Fitzpatrick, Cella, Harper & Scinto

(57) ABSTRACT

There are provided a conveying device capable of detecting a driving state of a conveying member with a simplified structure not requiring an encoder and the like, and an image-recording apparatus having the conveying device. A detector for detecting a surface aspect of a placing section of the conveying member is provided so as to recognize an operating state of the conveying member corresponding to the result detected by the detector.

13 Claims, 7 Drawing Sheets

CONVEYING DEVICE AND IMAGE RECORDING APPARATUS HAVING THE SAME

BACKGROUND OF THE INVENTION

1. Field of the Invention

The present invention relates to an image recording apparatus for recording images on a recording member, and in particular relates to a conveying device to be provided in the apparatus for conveying a member to be conveyed such as the recording member.

2. Description of the Related Art

An inkjet recording apparatus having an electrostatic-attraction-type conveying device for conveying a member to be conveyed such as a recording member will be described as a conventional image recording apparatus of such a kind, for example, with reference to FIGS. 6 to 7B. FIG. 6 is a schematic sectional view of a conventional image recording apparatus, and FIGS. 7A and 7B are a plan view and an enlarged sectional view of a conveying device for a recording member, respectively.

A recording apparatus 50 shown in FIG. 6 comprises a recording head 51 for recording images and a conveying belt 52, which is an electrostatic-attraction-type conveying member.

The recording head 51 is of a line type in that a number of nozzles are arranged in rows to have substantially the same width as that of the recording member, and can perform rapid image-forming in comparison with a serial type in which a recording head mounted on a carriage is scanned.

However, because of the high speed, ejected ink is unfixed just after recording, so that if anything is brought into contact with a recorded surface, images may be marred. Such a phenomenon may more or less occur even in the serial type image recording apparatus.

Then, in such an apparatus, the rear surface of the recording member is held with the conveying belt 52 having electrostatically-attracting means so as to convey the recording member without coming in contact with anything.

The conveying belt 52 is made by connecting both ends of a band member to be annular, and stretched and looped around a driving roller 58 and a plurality of supporting rollers 59 to 61, so that the recording member such as a paper sheet or plastic sheet is conveyed by rotating the conveying belt 52.

As the electrostatically-attracting means of the conveying belt 52, there is an electrode group (referred to as interdigital electrodes 53 and 54 below), in which strip-shaped electrodes with different polarities are alternately arranged as shown in FIG. 7A, and there are conductive brushes 55 arranged on both sides of the conveying belt 52 as power feeding means, as shown in FIG. 7B.

In such a structure, when one of the interdigital electrodes 53 and 54 is grounded while a predetermined voltage is applied to the other so as to produce a difference in potential, an attracting force due to electrostatic power can be obtained.

However, the conventional technique described above has the following problems.

The conveying belt 52 is driven by the driving roller 58 at a high speed, and foreign particles such as paper dust and oil are stuck to the driving roller 58 during the long time running, so that the frictional force between the driving roller 58 and the conveying belt 52 may be reduced or jamming due to plugged paper or dust may be produced, resulting in the abnormal driving of the conveying belt 52.

If such a case is neglected, the abnormal belt driving may finally result in a serious problem such as head damage or electric leakage, so that first hand stopping has been required.

Then, in order to detect the abnormal belt driving of the conveying belt 52, an encoder 56 attached to the supporting roller 59 is detected with a photosensor 57. Alternatively, although not shown, the driving state of the conveying belt is detected by reading an encoder pattern printed on the conveying belt with a photosensor.

However, as described above, the conventional conveying belt has had additional procedures and cost for attaching an encoder to the conveying belt or printing an encoder pattern thereon in order to detect the driving state of the conveying belt.

SUMMARY OF THE INVENTION

It is an object of the present invention to provide a conveying device being capable of detecting a driving state of a conveying member and having a further simplified structure without an encoder, and to provide an image-recording apparatus having the conveying device.

It is another object of the present invention to provide a conveying device with a conveying member having detecting means for detecting a surface aspect of a placing section for placing a member to be conveyed and being capable of recognizing an operating state of the conveying member corresponding to the result detected by the detecting means, and to provide an image-recording apparatus having the conveying device.

It is another object of the present invention to provide a conveying device having detecting means for detecting electrostatic power of a conveying member having a placing section for electrostatically attracting a member to be conveyed and being capable of recognizing an operating state of the conveying member corresponding to the result detected by the detecting means, and to provide an image-recording apparatus having the conveying device.

Further objects, features and advantages of the present invention will become apparent from the following description of the preferred embodiments with reference to the attached drawings.

DESCRIPTION OF THE PREFERRED EMBODIMENTS

An embodiment of the present invention will be specifically described below with reference to the drawings. However, the sizes, materials, shapes, and relative arrangements of the components described in the embodiment may be appropriately modified corresponding to the configurations and various conditions of an apparatus incorporating the present invention, so that the scope of the present invention is not limited to the embodiment below.

Figure 1:
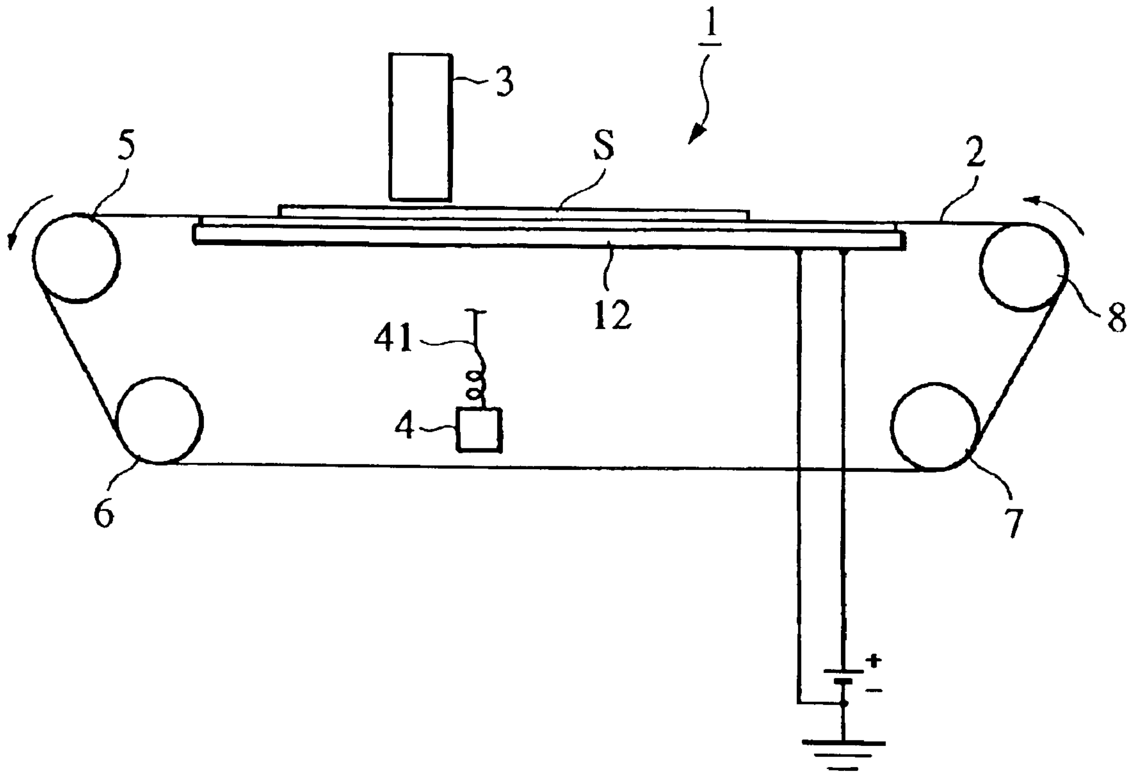
FIG. 1 is a schematic sectional view of an image-forming apparatus according to an embodiment of the present invention.
Figure 2A:
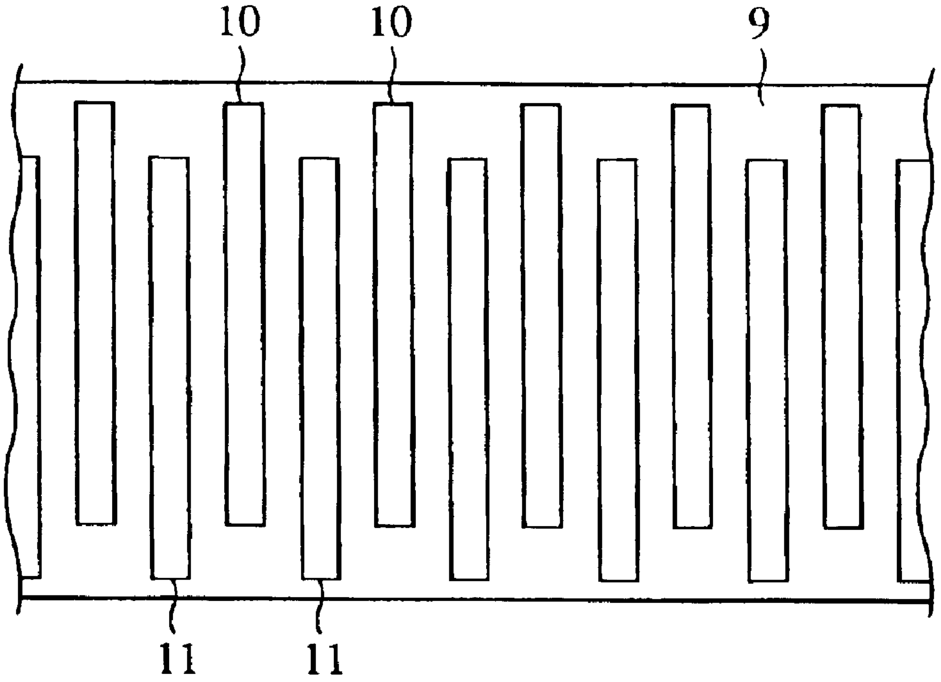
FIG. 2A is a plan view of a conveying device according to the embodiment of the present invention.
Figure 2B:
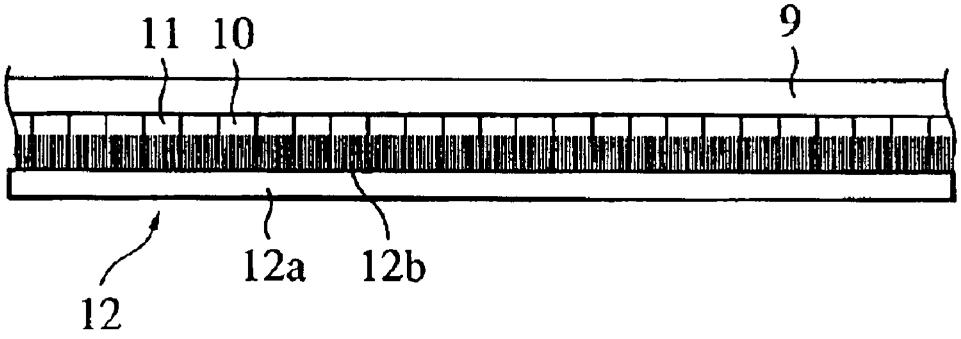
FIG. 2B is an enlarged sectional view of the conveying device.

FIG. 1 is a schematic sectional view of an image-forming apparatus according to the embodiment; FIG. 2A is a plan view of a sheet-conveying device; and FIG. 2B is an enlarged sectional view thereof.

An image-recording apparatus 1 shown in FIG. 1 is an example adopting a so-called inkjet system, and a recording head 3 is an inkjet recording head, which is driven by a control unit (not shown) so as to record images on a sheet member by the adhesion of an ink-droplet ejected from an ink nozzle.

A sheet member S, which is a member to be conveyed and a recording member, is supplied from a supply section (not shown) so as to move on a conveying belt 2 as a conveying member by being electrostatically held therewith, so that recording is performed thereon when the sheet member S passes under the recording head 3.

The conveying belt 2 is an annular band member, and stretched and looped around a driving roller 5 as driving means and supporting rollers 6 to 8 so as to convey a sheet member S such as a paper sheet or plastic sheet by rotating the conveying belt 2.

On the surface opposite to a conveying surface formed of a dielectric film layer 9 as the base of the conveying belt 2, interdigital electrodes 10 as a first electrode group and interdigital electrodes 11 as a second electrode group are formed as the electrostatic attracting means, in which strip-shaped electrodes are alternately arranged as shown in FIG. 2A (a surface aspect of the placing section of the conveying member for a member to be conveyed).

Each electrode of the interdigital electrodes 11 is placed between electrodes of the interdigital electrodes 10, and both the electrodes are alternately arranged in the conveying direction.

In the interdigital electrodes 10 and 11, electrodes, each with a thickness of 35 $\mu$m and width of 8 mm, are arranged 8 mm apart on the surface of the dielectric film layer 9, for example. Both sides of the conveying belt 2 are provided with conductive brushes 12 and 13 arranged as power feeding means, as shown in FIG. 2B.

Figure 3:
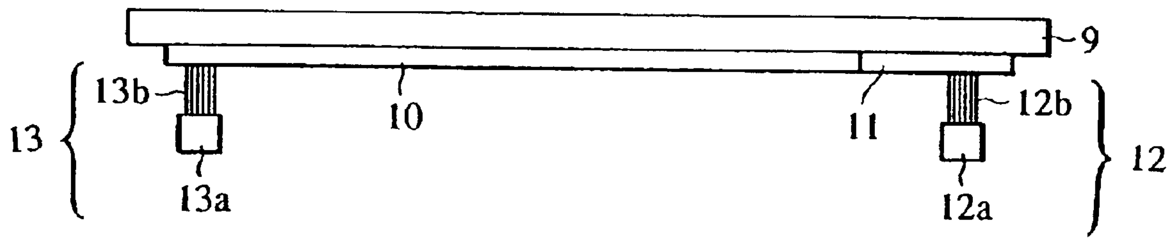
FIG. 3 is a front view of the conveying device according to the embodiment of the present invention.

The conductive brushes 12 and 13 are made by respectively planting conductive brushes 12_b_ and 13_b_ on base members 12_a_ and 13_a_, and as shown in FIG. 3, are brought into contact with the interdigital electrodes 11 and 10 of the conveying belt 2, respectively, so as to feed power thereto.

When a potential difference is produced between the interdigital electrodes 10 and 11 configured as described above so as to generate an electrostatic force, an attracting force is thereby obtained. According to the embodiment, while the conductive brush 13 is grounded, a voltage of 1 to 2 kV needs to be applied to the conductive brush 12 in order to obtain a predetermined electrostatic force.

In such a configuration, when the conveying belt 2 is rotated in the conveying direction, the interdigital electrodes 10 and 11 produce an electrostatic attracting force by receiving power through the sliding contact with the conductive brushes 12 and 13, thereby conveying a sheet member held to the conveying belt 2.

Figure 4A:
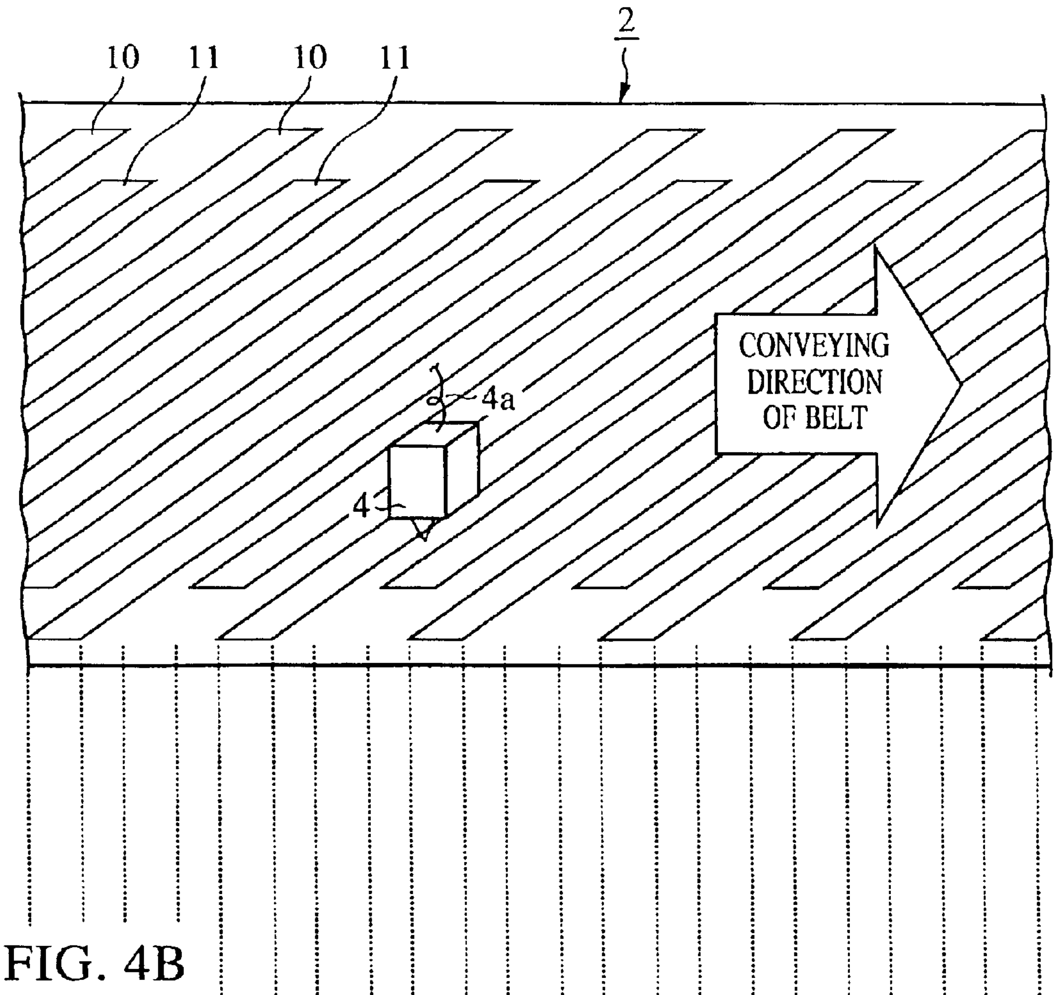
FIG. 4A is a schematic perspective view for illustrating an essential part of a conveying belt.

Furthermore, as shown in FIG. 4A, an optical sensor 4 is provided to oppose the surface of the conveying belt 2 as an example of the detecting means for detecting the interdigital electrodes 10 and 11. The optical sensor 4 is arranged to oppose the position where the interdigital electrodes 10 and 11 of the conveying belt 2 pass through, while detecting the presence of the interdigital electrodes 10 and 11 on the conveying belt 2 by sensing an electric current flowing by connecting a signal line 4_a_ to a circuit (not shown).

Figure 4B:
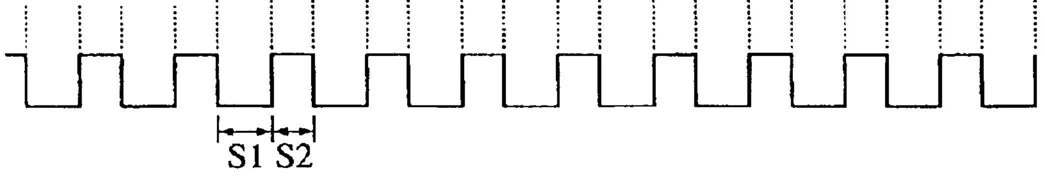
FIG. 4B is a drawing showing a signal waveform to be detected.

Therefore, as shown in FIG. 4B, when the interdigital electrode passes through the position opposing the optical sensor 4, a signal indicated by S1 is detected by the optical sensor 4, for example. Also, when an intermediate part between the electrodes passes through the position opposing the optical sensor 4, a signal indicated by S2 is detected. Accordingly, the state of the electrodes passing through the front of the optical sensor 4 can be recognized.

That is, by measuring the length of the detected signals S1 and S2 (detection period), a driving state of the conveying belt 2 can be recognized.

If the conveying belt 2 is not driven normally because of the effect of paper dust, etc., to have an irregular conveying speed, the detection period of the signals S1 and S2 changes, so that an abnormal driving state can be recognized by detecting the change using recognizing means to compare it with the normal period. This procedure is shown in FIGS. 5A to 5C.

Figures 5A, 5B, 5C:
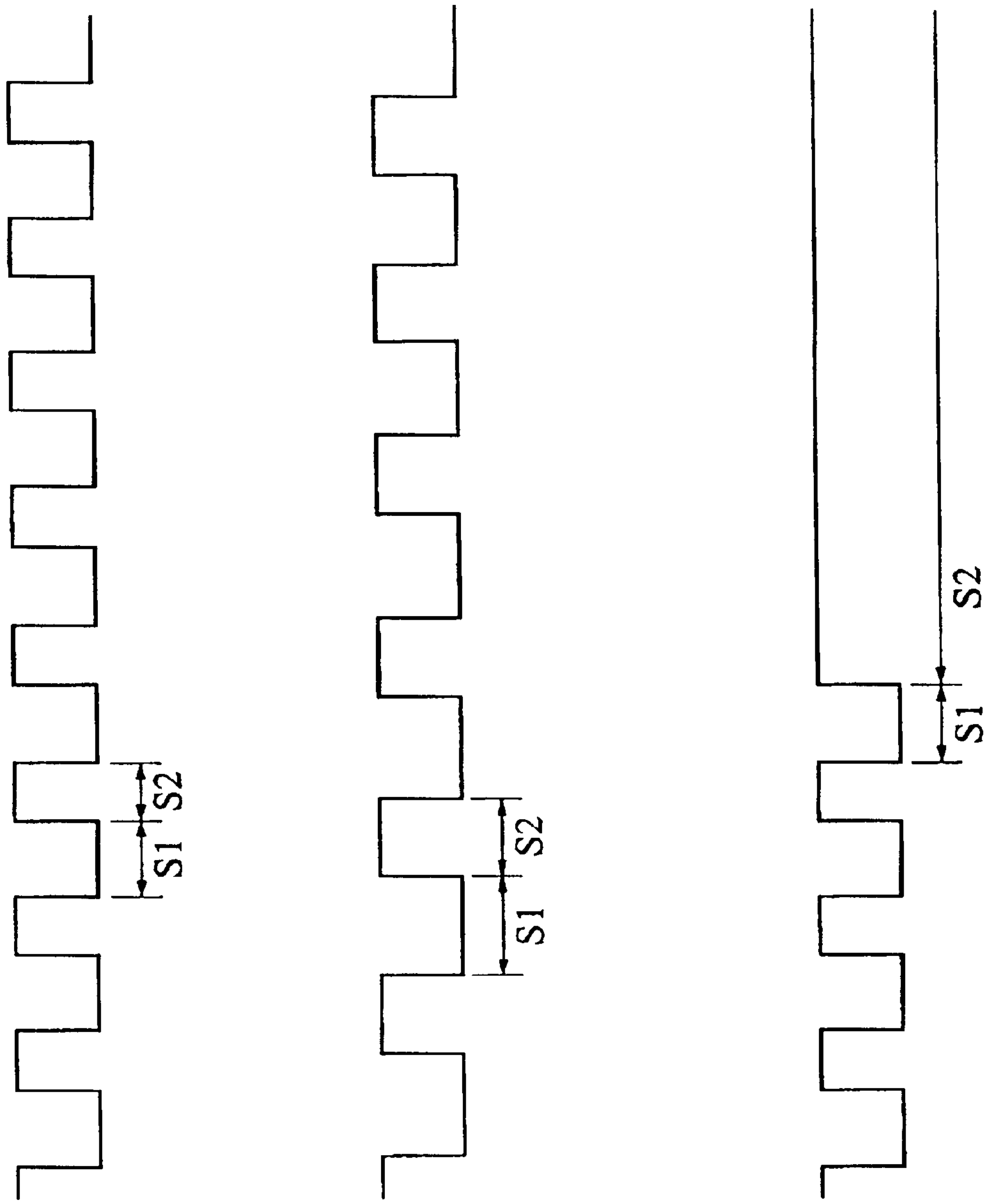
FIG. 5A is a drawing of a signal waveform for illustrating a driving state of the conveying belt, which is the waveform when being normal.
FIG. 5B is a drawing of a signal waveform for illustrating a driving state of the conveying belt, which is the waveform when the conveying belt is slipped so that the driving speed is partly reduced.
FIG. 5C is a drawing of a signal waveform for illustrating a driving state of the conveying belt, which is the waveform when the conveying belt is not driven.
Figure 6:
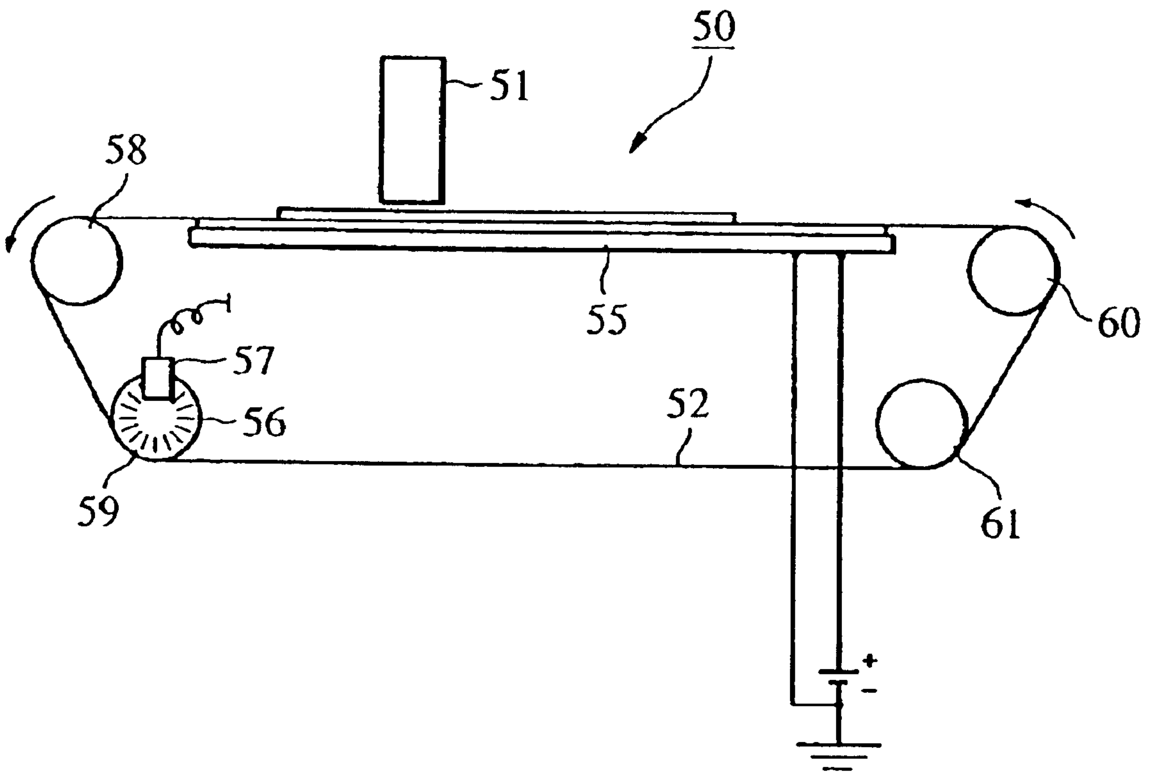
FIG. 6 Prior Art
FIG. 6 is a schematic sectional view of a conventional image-forming apparatus.
Figure 7A:
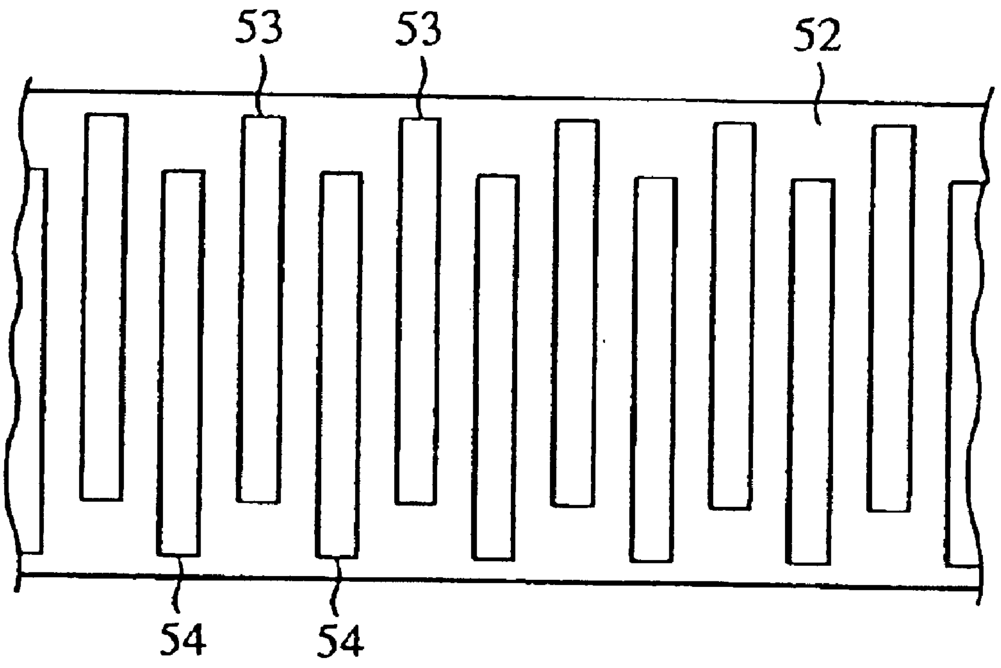
FIG. 7A Prior Art
FIG. 7A is a plan view of a conventional conveying device.
Figure 7B:
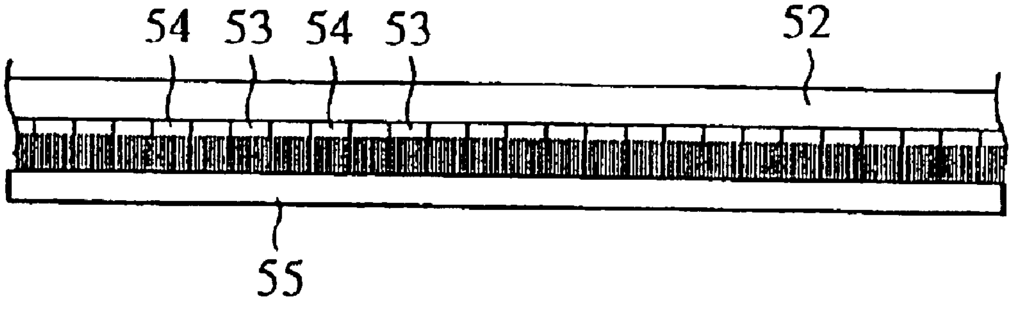
FIG. 7B Prior Art
FIG. 7B is an enlarged sectional view of the conventional conveying device.

FIG. 5A shows a normal signal waveform; and FIG. 5B shows a signal waveform when the driving speed is partly reduced by the slipping of the belt, in which the detection period of the signals S1 and S2 is increased larger than in normal driving.

FIG. 5C shows a signal waveform when the conveying belt 2 is not driven because of jamming, etc. As shown therein, the signal 52 remains turned on.

That is, the conveying device according to the embodiment has the recognizing means in that the optical sensor 4 detects an electrostatic force produced by the interdigital electrodes 10 and 11 formed on the placing section of the conveying belt 2 for a recording sheet and measures the detection period; then, the detected period is compared with the normal period; and if no significant differences are shown therein, the recognizing means recognizes the conveying state to be normal and if a significant difference is shown, it recognizes an abnormal conveying state.

When an abnormal driving state is discovered (recognized) in such a manner, the belt driving is immediately stopped by the controlling means and the ink ejecting by the inkjet recording head is stopped so as to stop the printing operation.

The detecting means for detecting the presence of the interdigital electrodes 10 and 11 may be a needle, roller, brush, or magnetic sensor other than the above-mentioned optical sensor 4. Any sensor may be used as long as it can detect an electrostatic power due to the electrodes disposed in the conveying belt 2 for electrostatic attraction.

As described above, according to the embodiment, there is provided the detecting means for detecting a surface aspect of the placing section of the conveying member, and an operating state of the conveying member can be recognized corresponding to the result detected by the detecting means, so that the structure is simplified and cost is reduced by eliminating an encoder and encoder pattern printed on the conveying member.

An abnormal conveying state of a member to be conveyed by the conveying member can be recognized by the simplified configuration and the abnormal state can be promptly corrected by the controlling means, so that a crucial breakdown can be avoided, enabling the function and reliability of the apparatus to be improved.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A conveying device comprising:

a conveying belt for conveying a member to be conveyed;

electrodes integrally formed with said conveying belt, wherein said electrodes move integrally with said conveying belt;

power supplying means for supplying power to said electrodes to attract the member to be conveyed to said conveying belt;

driving means for driving said conveying belt so that the member to be conveyed on said conveying belt is conveyed in a conveying direction;

detecting means for detecting said electrodes of said conveying belt; and recognizing means for recognizing an operating speed of said conveying belt corresponding to a period of signals generated by said detecting means.

2. A device according to claim 1, wherein said electrodes comprise a first electrode group comprising a plurality of electrodes arranged in the conveying direction at predetermined intervals and a second electrode group comprising electrodes, each of which is arranged between adjacent electrodes of the first electrode group, and said power supplying means produces a potential difference between said first electrode group and said second electrode group.

3. A device according to claim 2, further comprising controlling means for controlling said driving means for driving said conveying belt corresponding to the result detected by said detecting means.

4. A device according to claim 1, wherein said detecting means detects the presence of said electrodes.

5. A device according to claim 1, further comprising controlling means for controlling said driving means for driving said conveying belt corresponding to the result detected by said detecting means.

6. An image-recording apparatus comprising:

a conveying belt for conveying a recording member to be conveyed;

electrodes integrally formed with said conveying belt, wherein said electrodes move integrally with said conveying belt;

power supplying means for supplying power to said electrodes to attract the recording member to said conveying belt;

driving means for driving said conveying belt so that the recording member to be conveyed on said conveying belt is conveyed in a conveying direction;

detecting means for detecting said electrodes of said conveying belt;

recognizing means for recognizing an operating speed of said conveying belt corresponding to a period of signals generated by said detecting means; and a recording head for recording an image on the recording member conveyed by said conveying belt.

7. An image-recording apparatus according to claim 6, wherein said electrodes comprise a first electrode group comprising a plurality of electrodes arranged in the conveying direction at predetermined intervals and a second electrode group comprising electrodes, each of which is arranged between adjacent electrodes of the first electrode group, and said power supplying means produces a potential difference between said first electrode group and said second electrode group.

8. An image-recording apparatus according to claim 7, further comprising controlling means for controlling said driving means for driving said conveying belt corresponding to the result detected by said detecting means.

9. An image-recording apparatus according to claim 6, wherein said detecting means detects the presence of said electrodes.

10. An image-recording apparatus according to claim 6, further comprising controlling means for controlling said driving means for driving said conveying belt corresponding to the result detected by said detecting means.

11. An image-recording apparatus according to claim 6, wherein said recording head comprises an inkjet recording head.

12. A conveying device comprising:

a conveying belt for conveying a member to be conveyed;

electrodes arranged on an inner surface of said conveying belt, wherein said electrodes move integrally with said conveying belt;

power supplying means for supplying power to said electrodes to attract the member to be conveyed;

driving means for driving said conveying belt so that the member to be conveyed on said conveying belt is conveyed in a conveying direction;

an optical sensor for detecting said electrodes of said conveying belt; and recognizing means for recognizing an operating speed of said conveying belt corresponding to a period of signals generated by said optical sensor.

13. An image recording apparatus comprising:

a conveying belt for conveying a member to be conveyed;

electrodes arranged on an inner surface of said conveying belt, wherein said electrodes move integrally with said conveying belt;

power supplying means for supplying power to said electrodes to attract the member to be conveyed;

driving means for driving said conveying belt so that the member to be conveyed on said conveying belt is conveyed in a conveying direction;

an optical sensor for detecting said electrodes of said conveying belt;

recognizing means for recognizing an operating speed of said conveying belt corresponding to a period of signals generated by said optical sensor; and a recording head for recording an image on the member conveyed by said conveying belt.

* * * * *